Patented Aug. 15, 1944

2,356,095

UNITED STATES PATENT OFFICE 2,356,095

PROCESS FOR THE PURIFICATION OF HYDROCARBON LIQUIDS

Walter A. Schulze, Bartlesville, Okla., assignor to Phillips Petroleum Company, a corporation of Delaware No Drawing. Application January 27, 1942,
Serial No. 428,445

6 Claims. (Cl. 196—30)

This invention relates to the treatment of hydrocarbons, and more particularly to a treatment designed to free hydrocarbon liquids from undesirable impurities. Specifically this invention relates to an improved method for the treatment of hydrocarbon liquids of six or more carbon atoms with aluminum chloride for the substantially complete removal of impurities.

Liquid hydrocarbon products whether occurring naturally or resulting from manufacturing processes of various types are ordinarily first obtained as highly complex mixtures comprising hydrocarbons of various classes and accompanied by impurities such as nitrogen, oxygen, and sulfur compounds. For many purposes such mixtures may be satisfactory with only partial purification and relatively simple adjustment of physical characteristics such as boiling range, etc. In other cases, however, a high degree of purification may be necessary, and even extremely selective treatment to segregate hydrocarbons of a particular class from accompanying compounds of different molecular structure and/or chemical characteristics. This latter type of refining may involve processes such as superfractionation, solvent extraction and the like and further may require relatively drastic chemical treatment to accomplish final purification and removal of undesirable components.

Among the special hydrocarbon products requiring extensive purification and refining may be listed special paraffinic solvents, aviation fuels of low acid heat and olefin content, certain highly refined low-viscosity lubricants, and raw materials for chemical manufacturing processes such as chlorination, nitration and the like. These materials often receive a chemical treatment with aluminum chloride or similar reagents in order to desulfurize and purify the hydrocarbons and to remove traces of hydrocarbons of undesirable chemical reactivity and instability.

It is an object of this invention to provide an improved method of treating hydrocarbon liquids of the type described with aluminum chloride. Another object of this invention is to provide a process for the treatment of medium boiling range hydrocarbon liquids with aluminum chloride wherein the chemical is more efficiently utilized and excessive losses of reagent through sludge formation are avoided.

Still another object of this invention is to provide an improved aluminum chloride reagent which permits more efficient contact with and separation from hydrocarbon liquids.

Although the reagent and process of this invention is adaptable to a variety of process equipment and procedures, it is of particular application to the batch or counter-current staged contacting of hydrocarbon liquids with aluminum chloride in which the chemical is a minor component of the mixture. In such procedures, it is of prime importance to maintain a high dispersion of the granular, finely-divided reagent in order to efficiently treat the liquid with minimum quantities of aluminum chloride. In practice, the maintenance of an adequate dispersion of the highly reactive and hygroscopic aluminum chloride is difficult, particularly with lighter, less viscous hydrocarbons. The difficulties may arise from the formation of sludge in the treating reaction and from the absorption of traces of water by the chemical to form sticky lumps of semi-solid reagent. The intimacy of contact is thus reduced and the consumption of reagent is greatly increased while the recovery of both hydrocarbons and partially consumed chemical is adversely affected.

I have discovered that the refining treatment described may be greatly improved from the standpoint of both reagent costs and product quality by employing the aluminum chloride in the form of an adsorbed solid phase supported on a granular solid adsorbent carrier which functions not only as a dispersing agent but also as an agent adapted to adsorb water and liquid sludge present or formed in the hydrocarbon liquid.

This type of reagent is prepared from aluminum chloride of suitably small particle size and a substantially completely dehydrated adsorbent carrier and the mechanical characteristics are such that separation of chemical and carrier during the refining treatment is substantially avoided.

The reagent may be prepared in a number of ways, and the preparation is directed principally to securing a uniform, intimate combination of chemical and carrier. The mixing may be accomplished with both components in substantially dry state, or, if desired, the substantially water-free carrier may be moistened with the liquid to be treated, and the aluminum chloride added to the moist particles as an adherent film or slurry. Still another efficient method of preparation is to sublime the aluminum chloride onto the carrier, in which case the sublimed solid particles are deposited in extremely finely-divided form on the adsorbent carrier surfaces.

The composition of the reagent may vary within wide limits, depending on the nature and purity of the liquid to be treated and the number of treating stages. When a single stage of treatment is employed, it is often economical to add sufficient aluminum chloride to effect the desired degree of refining and to discard the spent reagent to such subsequent recovery steps as may be economical. In such a case, the reagent composition would be calculated from the minimum volume of reagent required for efficient contacting and the weight of aluminum chloride required for substantially complete reaction. Thus the reagent may contain from five or less to seventy five or more weight per cent of aluminum chloride, with best results often being obtained with reagents containing from twenty to fifty weight per cent of active ingredient.

The carrier for the reagent may be chosen from the group of suitably adsorbent granular materials of high porosity, including bauxite, synthetic alumina, silica, and clay-type minerals or activated derivatives thereof. In view of the hygroscopic nature of the aluminum chloride and the desirability of having maximum adsorbent capacity in the carrier, the adsorbent materials are ordinarily dehydrated to the extent that both chemically and mechanically bound water is removed. In this respect, it has been found that bauxite is a superior component of the reagent because substantially complete dehydration of this material at temperatures as high as 1200 to 1300° F. does not destroy the adsorbent qualities nor the physical structure of the mineral so that its capacity for retaining aluminum chloride and reaction products thereof is unimpaired. In contrast, synthetic aluminas and silica gel may be impaired by equivalent dehydration.

The liquids to be treated by the process of this invention are ordinarily prepared by preliminary purifying steps so that the aluminum chloride reagent is conserved. The liquids are also substantially free of entrained water and may receive further dehydrating treatment to remove dissolved water. The liquid feed is mixed with the aluminum chloride reagent by suitable mechanical agitating devices, and the reaction is allowed to continue until the treated product conforms to specifications.

The volume proportions of reagent and hydrocarbon liquid will depend to a large extent on the percentage of active chemical in the solid reagent, and on the amount of impurities and extraneous matter in the liquid being treated. In order to limit both the time of contact and the amount of reagent used, the treatment may be divided into a series of treating stages when the required extent of purification exceeds the economic limits of a single stage. In most instances, good results may be obtained by treating the liquids with from about 0.5 to 5 weight per cent of aluminum chloride, while a narrower range of 0.5 to 2 weight per cent is often sufficient.

The corresponding volume and weight of reagent being dependent on the weight per cent of active ingredient in the reagent composition, the time of contact may range from about one minute to about one hour, again depending on the liquid being treated, the strength of the reagent and the efficiency of contact.

Temperatures during the treating process are regulated at values which give relatively rapid removal of impurities but are not high enough to cause undesirable side reactions, sublimation of the aluminum chloride or undesired changes in the molecular structure of the hydrocarbons. Thus, the process may be operated at ordinary atmospheric temperatures of 40 to 140° F. Higher temperatures are not usually desirable, except perhaps in the treatment of rather heavy distillates which are relatively viscous at low temperatures. Pressures are normally low superatmospheric pressures to enable the flow of liquids through process equipment.

At the conclusion of the treating reaction, the hydrocarbon products are separated from the reagent and may be given an after-treatment to remove entrained or dissolved traces of acidic reaction products. This after-treatment is commonly a caustic wash, and may be followed by a water wash and a re-distillation operation if desired.

The reagent of this invention is particularly well adapted to use in a series of treating stages in which the hydrocarbon liquid travels countercurrent to the reagent. In such applications whether batchwise or continuous, the ease and completeness with which the reagent may be separated from the hydrocarbon liquid aid in such stage operation. Also, the fact that the still active ingredients of the used reagent are distributed on the exposed surfaces thereof and not occluded in masses of unreactive sludge contributes to the efficiency of a multi-stage process.

The following examples will serve to illustrate specific applications of the process of this invention to the treatment of hydrocarbon liquids for the removal of impurities.

*Example I*

An aromatic oil fraction from the pyrolysis of light hydrocarbons was fractionated to yield a crude toluene cut. This material was then acid-treated and rerun to reduce the content of non-aromatic olefins to about two volume per cent. This partly refined toluene was then treated with about 3 per cent by weight of a reagent composed of 40 weight per cent aluminum chloride and 60 weight per cent of bauxite. The reagent was substantially anhydrous since the bauxite had been dehydrated at 1300° F. prior to mixing with anhydrous aluminum chloride.

Agitation of the mixture at 80° F. for 20 minutes produced a toluene which when caustic washed and redistilled contained only 0.3 per cent of unnitratable material.

Equivalent results with aluminum chloride alone involved the use of an approximately equal weight of the pure chemical so that chemical consumption was over twice as great.

*Example II*

A special paraffinic solvent naphtha obtained by precise fractionation was +25 Saybolt color after sweetening and contained 0.15 per cent sulfur. This naphtha was agitated for 40 minutes at 90° F. with 1 per cent by weight of a reagent consisting of 25 per cent anhydrous aluminum chloride and 75 per cent dehydrated alumina. At the end of the agitation period, the naphtha was filtered from the reagent which remained in granular non-sticky form. The hydrocarbon liquid was given a caustic wash and redistilled to produce a +30 color product of 0.04 per cent sulfur.

*Example III*

A high octane high boiling range naphtha obtained by solvent extraction for aviation fuel blends was treated with aluminum chloride to reduce the sulfur content and improve the gum stability. When the powdered chemical was used, consumption amounted to about three per cent by weight, with a large portion lost by sludge formation and hydrolysis. Difficulty was also experienced in separating the hydrocarbon liquid from the chemical sludge.

When treated with three weight per cent of a reagent consisting of seventy per cent calcined bauxite and thirty per cent freshly sublimed aluminum chloride, the product was of satisfactory gum stability and the sulfur content was reduced from 0.1 per cent to 0.02 per cent. The hydrocarbon separated cleanly from the reagent and volume losses in treating were decreased.

In treating hydrocarbon liquids with the reagent of this invention, it has been found that very large volumes of hydrocarbons may be treated with a given weight of refining reagent. Moreover, the adhesive masses of sludge and reagent which may result when the carrier is absent, coating the walls of contact vessels and sometimes clogging connecting lines, do not form to such an extent when the adsorbent carrier is present. These beneficial effects are attributed to the dehydrating action of the carrier together with the adsorbent action on the sludge formed. For this reason, the preferred reagents include carriers of maximum adsorbent capacity and minimum water content in order that these functions of the carrier be utilized to the fullest extent during the treating process. This proposed mechanism for the functions of the carrier seems most likely in view of the fact that temperatures are generally too low to cause substantial sublimation of the aluminum chloride. Also, there are no conditions of liquid or vapor flow through the reagent which would carry away the chemical and thus require a retaining or partially blanketing non-volatile base.

While the foregoing discussion has disclosed and specifically illustrated the process and reagent of the invention, it will be obvious that many modifications are possible within the scope of the disclosure. No limitations are, therefore, intended except as defined in the claims.

I claim:

1. The process for the purification of hydrocarbon liquids containing six or more carbon atoms which comprises contacting said liquids under conditions which promote removal of impurities without substantial molecular rearrangement with a reagent comprising essentially a comminuted mixture of anhydrous aluminum chloride and a substantially completely dehydrated granular adsorbent carrier selected from the group consisting of bauxite, synthetic alumina, silica and clays.

2. The process as in claim 1 in which the reagent consists of substantially completely dehydrated bauxite bearing from about 5 to about 50 weight per cent of anhydrous aluminum chloride.

3. The process for the removal of readily-polymerizable impurities from hydrocarbon liquids of six or more carbon atoms which comprises treating liquids containing minor amounts of said impurities at atmospheric temperatures with a minor proportion of a reagent comprising essentially a substantially completely dehydrated granular adsorbent carrier selected from the group consisting of bauxite, synthetic alumina, silica and clays bearing anhydrous aluminum chloride for a period of time sufficient to substantially complete the conversion of the impurities to relatively hydrocarbon-insoluble form, recovering the hydrocarbon liquid from the reagent and insoluble material, and redistilling the treated liquid after an alkaline wash to produce a substantially purified liquid.

4. The process as in claim 3 in which the reagent comprises essentially substantially completely dehydrated bauxite bearing effective amounts of anhydrous aluminum chloride.

5. In a process for the substantially complete purification of medium boiling range hydrocarbon liquids of six or more carbon atoms containing small amounts of readily-polymerizable impurities by treating same with aluminum chloride to convert the impurities to relatively hydrocarbon-insoluble form, the step of employing the reagent in the form of substantially completely dehydrated bauxite bearing an effective amount of anhydrous aluminum chloride.

6. Process for the purification of hydrocarbon liquids containing six or more carbon atoms which comprise contacting said liquids under conditions which promote removal of impurities without substantial molecular rearrangement with a reagent comprising essentially a comminuted mixture of anhydrous aluminum chloride and substantially completely dehydrated bauxite.

WALTER A. SCHULZE.